No. 875,800.

PATENTED JAN. 7, 1908.

J. GILSON.
FRICTION CLUTCH PULLEY.
APPLICATION FILED MAY 11, 1907.

Witnesses:
C. F. Duvall
T. B. Beall

Inventor:
John Gilson,
by M. J. Duvall, Attorney

UNITED STATES PATENT OFFICE.

JOHN GILSON, OF PORT WASHINGTON, WISCONSIN, ASSIGNOR TO GILSON MANUFACTURING COMPANY, OF PORT WASHINGTON, WISCONSIN, A CORPORATION.

FRICTION CLUTCH-PULLEY.

No. 875,800.

Specification of Letters Patent.

Patented Jan. 7, 1908.

Application filed May 11, 1907. Serial No. 373,061.

*To all whom it may concern:*

Be it known that I, JOHN GILSON, of Port Washington, in the county of Ozaukee and State of Wisconsin, have invented an Improvement in Friction-Pulleys, of which the following is a specification.

This invention is an improvement in friction pulleys of that particular class which are applied on the end of a driving shaft for the purpose of connecting the load thereto.

The primary object of the invention is to provide a clutch pulley which is especially adapted for application to the crank-shaft of a gas-engine, whereby the pulley may be disengaged from the shaft so as to relieve the engine of the load during the operation of starting up the engine.

A further object of the invention is to provide a clutch pulley which will gradually connect the load to the shaft while the latter is in motion and without causing any jar or slackening of the motor power.

A further object of the invention is to provide a strong, durable, and easily operated clutch mechanism for gas-engines which will operate with but little wear of the parts and when in clutched engagement will securely hold the clutched parts from slipping.

Other though minor objects of the invention will hereinafter appear, and what I claim as new will be specifically set forth in the appended claims.

Figure 1:
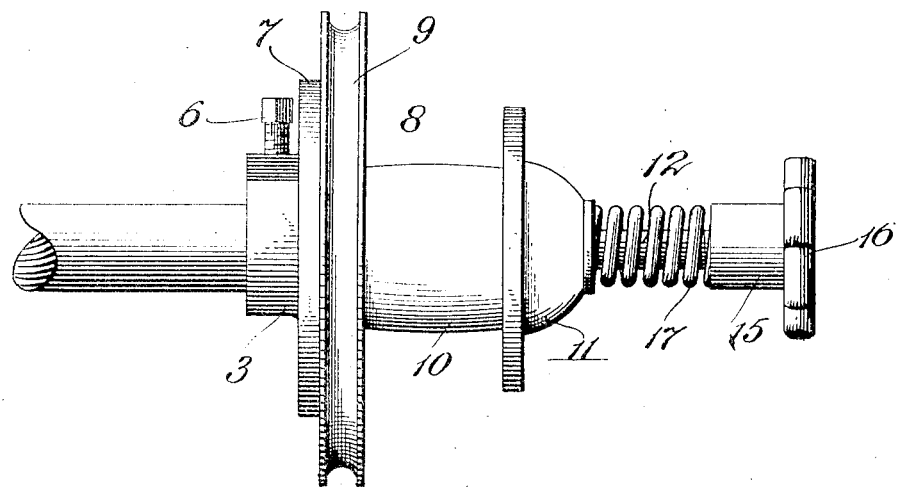
Figure 2:
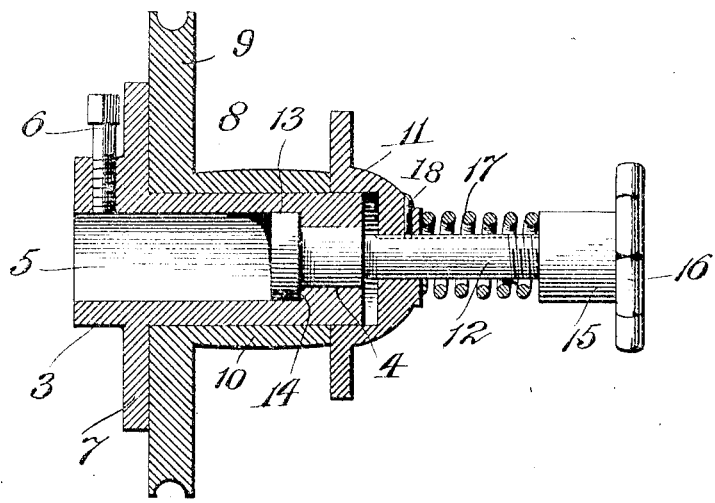

In the accompanying drawings, forming a part hereof: Figure 1 is a side view of a friction clutch constructed in accordance with my invention. Fig. 2 is a longitudinal sectional view thereof.

Like numerals of reference indicate like parts in both figures of the drawings.

3 designates a clutch-member which is adapted to fit upon the end of the shaft, and the hub of said member is provided in its outer end with an opening 4, of smaller diameter than the opening 5 which receives the shaft, said openings communicating with each other, as shown. This clutch-member is provided at its inner end with a set-screw 6, by which it is fastened to the shaft, and adjoining this set-screw with a friction-disk 7, the latter having a face with which the pulley engages, as hereinafter described.

Loosely mounted on the hub of the clutch-member 3 is a pulley 8, which in the present instance is what is termed a combination pulley, one part of which, as 9, being adapted to receive a round belt, and the other part, as 10, adapted for a flat belt, and said combined pulley is of such width that when one end is in engagement with the friction disk 7 the other end is slightly within the outer end of the hub of the clutch-member 3. The pulley is placed on the hub of the clutch-member with the larger part or pulley 9 next to the friction-disk 7, and so that the outer face of said part or pulley 9 will frictionally engage said disk.

Slidable upon the outer end of the hub of the clutch-member, so as to bear against the outer end of the combined pulley, is a clutch-member 11, and the hub of this latter clutch-member is provided with a hole through which passes a bolt 12, said bolt also passing through the smaller opening 4 in the end of the clutch-member 8, and is provided with a head 13 which bears against the shoulder 14 formed by the different size openings, and the outer portion of said bolt is threaded to receive a nut 15 having a hand-wheel 16. Interposed between the nut 15 and the clutch-member 11 is a compression-spring 17, and the tension of this spring is regulated, as will be obvious, by turning the nut on the threaded end of the bolt. The clutch-member 11 is provided with an annular flange which serves the purpose of a guard at the outer end of the pulley 10 for a flat belt.

As will be understood by reference to Fig. 2 the bolt 12 turns loosely in the clutch-member 3, but is connected to the clutch-member 11 by a pin 18 on the latter engaging in a groove in said bolt, so that when the clutch-member 11 is in frictional engagement with the pulley it will hold the bolt while the nut is being turned. The clutch-member 3 is fastened to the shaft, and when the pulley is clamped between the disk 7 and clutch-member 11 all the parts will then turn with the shaft so as to engage the load therewith, and by the provision of the spring there is a yielding engagement of the pulley with the shaft so that any excess of load suddenly applied will not stop the motor-power.

The bolt is threaded in the direction that when the parts are being tightened the hand-wheel or nut is turned in the opposite direction to the rotation of the shaft, and this provides that when the shaft is revolving it is only necessary to hold the nut to tighten the clutch-members on the pulley.

As heretofore stated the device is specially adapted for gas-engines, so that in starting up the engine the driving-shaft thereof may be relieved of the load; but of course I do not intend that the application of the pulley shall be limited to this extent.

Having thus described my invention, what I claim as new and desire to secure by Letters-Patent, is—

1. In a friction pulley, the combination with a rotatable shaft, of a clutch-member fixed thereon and having a hub and friction-disk, a bolt loosely engaging the hub at one end and threaded at its other end, a second clutch-member slidable upon the outer end of the hub and rotatably engaging the bolt, a pulley loosely mounted on the hub of the fixed clutch-member between the friction-disk and slidable clutch-member, and a nut adapted to move the slidable clutch-member against the outer end of the pulley.

2. In a friction pulley, the combination with a rotatable shaft, of a clutch-member fixed thereon and having a hub and friction-disk, a bolt loosely engaging the hub at one end and threaded at its other end, a second clutch-member slidable upon the outer end of the hub and rotatably engaging the bolt, a pulley loosely mounted on the hub of the fixed clutch-member between the friction-disk and slidable clutch-member, a nut on the threaded end of the bolt having a hand-wheel, and a compression spring on the bolt between the nut and movable clutch-member.

3. In a friction pulley, the combination with a rotatable shaft, of a clutch-member fixed thereon and having a hub and friction-disk, a bolt loosely engaging the hub at one end and threaded at its other end, a second clutch member slidable upon the outer end of the hub and rotatably engaging the bolt, said second clutch-member having a projecting flange, a combination-pulley mounted on the hub and having a wide end which engages the friction-disk and a narrower end with which the movable clutch-member engages and beyond which the flange projects, a nut on the threaded end of the bolt having a hand-wheel, and a compression spring on the bolt between the nut and movable clutch-member, substantially as shown and described.

In testimony whereof I have signed my name to this specification in the presence of two subscribing witnesses.

JOHN GILSON.

Witnesses:
HARRY W. BOLENS.
T. A. BOERNER.